United States Patent [19]

Noyes, Jr. et al.

[11] Patent Number: 4,688,204
[45] Date of Patent: Aug. 18, 1987

[54] PULSED OPTICAL DATA DETECTION SYSTEM

[75] Inventors: George I. Noyes, Jr.; Prabodh L. Shah, both of Boulder County, Colo.

[73] Assignee: Storage Technology Partners II, Louisville, Colo.

[21] Appl. No.: 672,304

[22] Filed: Nov. 16, 1984

[51] Int. Cl.$^4$ .............................................. G11B 7/00
[52] U.S. Cl. ........................................ 369/59; 360/46; 369/124
[58] Field of Search ....................... 369/44, 45, 46, 59, 369/100, 124; 360/46, 67

[56] References Cited

U.S. PATENT DOCUMENTS

| | | | |
|---|---|---|---|
| 4,385,328 | 5/1983 | Tanaka | 360/46 |
| 4,467,462 | 8/1984 | Shibata | 369/45 |
| 4,541,083 | 9/1985 | Maeda et al. | 369/44 |
| 4,563,760 | 1/1986 | Maeda et al. | 369/44 |
| 4,564,929 | 1/1986 | Yonezawa et al. | 369/44 |

Primary Examiner—Donald McElheny, Jr.
Attorney, Agent, or Firm—Woodcock Washburn Kurtz Mackiewicz & Norris

[57] ABSTRACT

Disclosed is a data detection system and method for accurately detecting data transition marks recorded on a recording surface. A data transition pulse, generated by a data head as recorded data transition marks pass thereby, is presented to consecutive delay circuits in order to generate first and second delay pulses. The second delay pulse and the data transition pulse are subtracted from the first delay pulse, thereby creating a narrow output pulse that indicates the occurrence of a data transition. This narrow output pulse is used to toggle a flip-flop or equivalent logic circuit, the flip-flop output thereby representing a recreation of the data as recorded on the recording surface. The system is best suited for use with an optical storage system wherein data transitions are recorded on an optical disk as spots of substantially uniform size, although the detection system does not require that the spots be uniform size.

15 Claims, 9 Drawing Figures

PULSED OPTICAL DATA DETECTION SYSTEM

BACKGROUND OF THE INVENTION

This invention relates to digital data detection systems, and more particularly to an optical data detection system that detects data marks representing data transitions.

In an optical storage system, data is recorded on optical media by placing marks on the media, typically in concentric or spiral tracks, that represent the data to be stored. These marks alter the reflectivity or transmissivity of the media at the point where the mark is located. Stored data is subsequently read by directing a narrowly focused beam of light to the data track where the data is recorded and by monitoring this beam as it reflects off of, or passes through, the media. The intensity (or other characteristic, such as phase where coherent light is used) of the reflected or transmitted beam is modulated in accordance with the data patterns marked on the media. Hence, by monitoring the intensity (or other characteristic) of the reflected or transmitted beam, the data stored on the media can be detected.

Generally, digital data is represented on optical media by having a low reflectivity or transmissivity mark represent one digital state, and a high reflectivity or transmissivity mark represent the other digital state. A long string of all ones or zeros marked as one continuous state on the media, where the media normally exhibits the other continuous state (e.g., a long strip of high reflectivity placed on a normally low reflectivity media surface), is generally undesirable because continuous energy in some form, such as a laser beam, must be directed to the surface of the media—typically a rotating disk—at substantially the same power levels. Maintaining the same power levels over relatively long time periods is difficult to achieve. Further, electrical or optical noise can significantly alter what would otherwise be a continuous power level. Moreover, a sufficient number of data transitions, where data transitions are used to define the boundaries between data bits, is needed to generate the synchronous clock signals used to recover or detect the data. Hence, digital coding is generally used, such as a 2,7 code (well known in the art), prior to marking the data on the media in order to preclude the possibility of a long string of all zeros or ones from occurring. (A 2,7 code ensures that no fewer than 3 encoded bits nor no more than 8 encoded bits of data will occur without a data transition.) However, even when a 2,7 code (or other suitable code) is used, constant power levels must still be maintained for time periods substantially longer than one bit time. When semiconductor (diode) lasers are used as the source of the marking energy, or when the source of marking energy is being regularly switched on and off, maintaining constant power levels for even a few bit periods may be difficult. This is because turn-on transients, temperature effects, etc., all influence the initial power levels as the device is first turned on. Accordingly, there is a need in the art for an optical data marking scheme wherein the marking energy need only be on for very short time periods. Such short time periods would advantageously further reduce the adverse contribution of electrical and optical noise to the marking process.

It is known in magnetic recording art to represent digital data by changes in magnetic flux that occur at the point of data transitions in the data to be recorded. When this technique is used, and when the magnetic flux changes are subsequently detected by a magnetic read head, a series of pulses are generated that represent the data transitions that have been detected. The informational content of the data is then found in the spacing or distance between adjacent pulses. In accordance with the invention disclosed herein, such a data-transition marking scheme could also be used to optically record digital data. That is, a single pulse or spot could be optically marked on the media to represent a data transition. A suitable code, such as 2,7 code, could still be used to ensure that a sufficient number of data transitions occurred. The informational content of the data would then be found in the spacing or distance between adjacent spots.

If such a "pulsed optical" data marking scheme is employed, and if the spots are subsequently detected using conventional optical detection techniques, the distance between adjacent spots can only be accurately determined if the spots are of uniform size. This, in turn, requires that the write power of the marking laser beam (or other energy source) be maintained substantially constant. As indicated previously, this is not an easy task, especially when the source of energy is being pulsed on and off. What is needed is a detection system that can accurately measure the spacing or distance between adjacent spots even though the spots may be of non-uniform size. In such a case, one need not be concerned with maintaining the energy level of the writing source, e.g. the write laser beam, at constant levels. Moreover, if spot size were not important, then intensity variations caused by transmissivity or reflectivity changes of the media (which may occur over time) would likewise be of little consequence. The present invention is directed to a detection system wherein spot size may vary without introducing significant errors in the detection process of determining the spacing between adjacent spots.

Optical data detection schemes known in the art, especially where relatively long sequences of one reflectivity or transmissivity state occur, may also disadvantageously produce a dc bias or offset into the detected signal. This offset must be removed in order to maintain the integrity of the detected signal, which removal, if possible at all, may significantly complicate the circuitry used to perform the detection function. A pulsed optical data detection system, as disclosed herein, would advantageously eliminate many of the concerns associated with dc offset because the detection scheme is pulse position sensitive and its matched filtering action effectively removes dc and low frequency components.

SUMMARY OF THE INVENTION

It is an object of the present invention to provide a pulsed optical detection system and method that accurately detects the position information between consecutive data transition marks regardless of the relative size of the marks.

It is a further object of the present invention to provide such a detection system and method wherein dc offset and noise are removed from the detected signal.

Another object of the present invention is to provide a pulsed optical data detection system and method that is insensitive to intensity variations of reflected or transmitted light caused by reflectivity or transmissivity changes of the media upon which the data transition marks have been recorded.

Still a further object of the present invention is to provide such a data detection system and method that is relatively simple to implement and inexpensive to manufacture and maintain.

The above and other objects of the invention are realized in an optical storage system that includes optical media upon which marks, representing data transitions, may be optically written by a pulsed energy source, such as a laser beam. As these recorded data transition marks pass under an optical head, a transition pulse is generated that is presented to consecutive delay circuits in order to generate first and second delay pulses. The second delay pulse and the data transition pulse are subtracted from the first delay pulse to generate a narrowed output pulse that indicates the occurence of a data transition. This narrowed output pulse is used to toggle a flipflop, or equivalent logic circuit, the output of which flipflop thereby represents a recreation of the data as recorded on the recording surface.

Advantageously, the data marks recorded on the recording surface need not be of uniform size. The transition pulses generated by the optical head as the data marks pass thereunder assume a width commensurate with the size of the data mark. As the first and second delayed pulses are generated, these pulses likewise have a width commensurate with the data transition pulse. By subtracting the initial transition pulse and the second delayed transition pulse from the first delayed transition pulse, the variations in width of any data transition pulse are essentially removed from the narrowed pulse that is generated. Hence, the detection system remains substantially insensitive to the detected pulse width.

In the preferred embodiment of the invention, the first and second delay circuits are connected in tandem and have an equal delay associated therewith. The first delayed pulse may be multiplied by an appropriate scale factor, as may the initial transition pulse and the second delayed transition pulse prior to performing the subtraction operation.

In a preferred embodiment, the input pulse signal and the second delayed signal are compared in comparator circuits with the first delayed signal. The output of the comparator circuits is a digital signal having a prescribed level whenever the first delay signal is greater than the input or second delayed signal, respectively. These digital signals are logically combined, and the resulting output is then used as a clock signal to toggle a flipflop. In such an embodiment the first delay is equal to the second delay, and both delays are realized for example by using the propagation delay associated with a fixed length of coax cable, or a lumped L, C delay line.

The method of the present invention is adapted for use with an optical storage system wherein data is recorded by writing data transition marks on the recording surface and assumes that some sort of optical head detection means is present for generating a data transition pulse whenever a recorded data transition mark passes under the optical head. The method includes the steps of: (1) delaying the data transition pulse by a first prescribed time in order to create a first delay pulse; (2) delaying the first delayed pulse by the same prescribed time to create a second delayed pulse; (3) subtracting the second delayed pulse from the first delayed pulse in order to create a third pulse; (4) subtracting the data transition pulse from the first delayed pulse to create a fourth pulse; (5) combining the third and fourth pulses to create a fifth pulse; and (6) using the fifth pulse as a measure of the occurence of a data transition mark within the data recorded on the recording surface. The time between occurrences of successive fifth pulses is thus an accurate measure of the distance between successive data transition marks.

BRIEF DESCRIPTION OF THE DRAWINGS

The above and other objects, features, and advantages of the present invention will be more apparent from the following more particular description thereof, presented in conjunction with the following drawings, wherein.

DETAILED DESCRIPTION OF THE INVENTION

Figure 1:
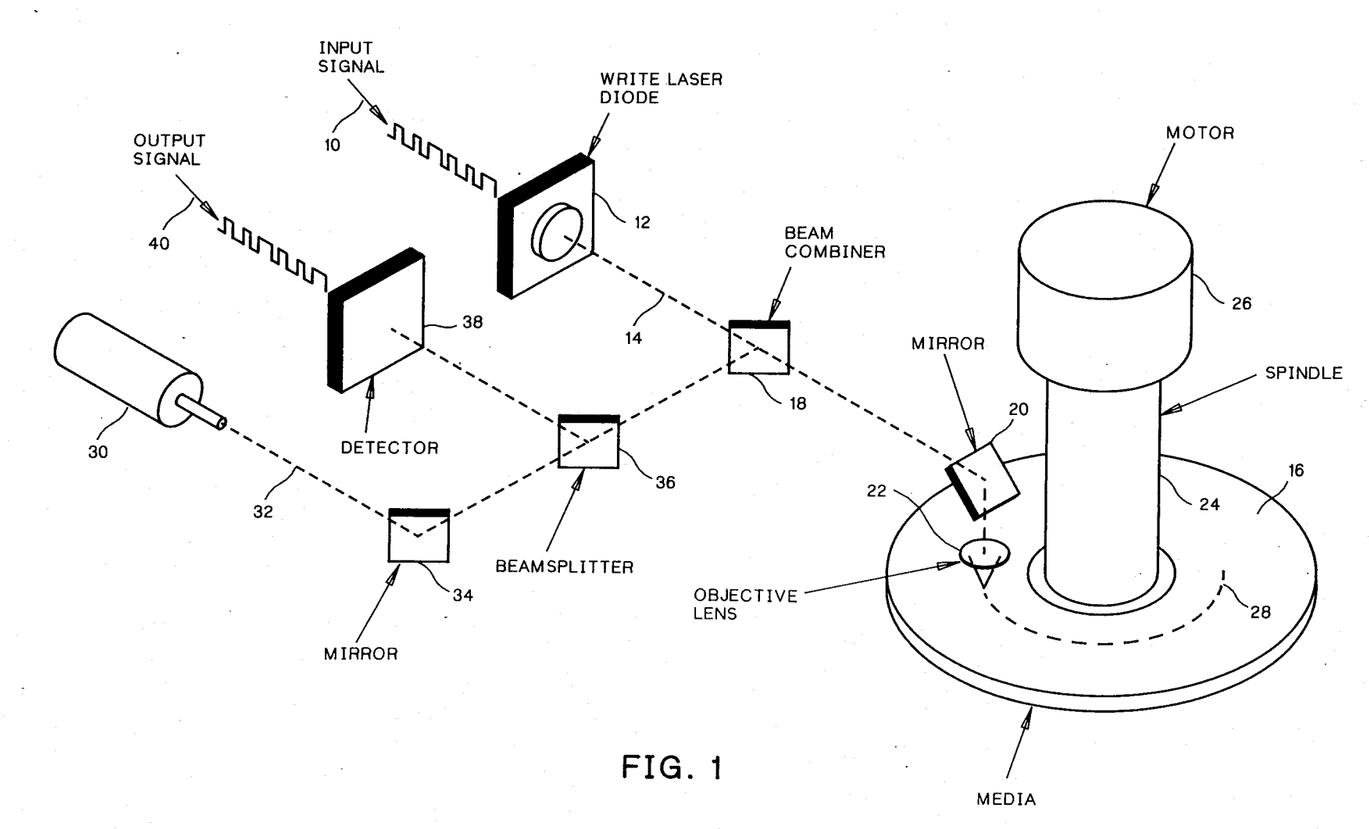
FIG. 1 schematically illustrates the basic components associated with an optical storage system.

The present invention is adapted for use within an optical storage system of the type where digital data is stored on an optical recording medium. FIG. 1 illustrates the basic components associated with such an optical storage system. Referring to FIG. 1, a digital input signal 10 modulates a write laser diode 12 to generate a write beam 14. This write beam 14 is directed to the surface of the optical recording media 16 through a suitable optical path that includes a beam combiner 18, a mirror 20, and an objective lens 22. The objective lens 22 focuses the write beam 14 to a narrow spot on the surface of the media 16. The media 16 is mounted on a spindle 24 that is rotated by a motor 26. The write laser beam 14 has sufficient energy associated therewith to permanently mark the surface of the recording media 16. Hence, as the media 16 rotates, a data track 28 is marked thereon by the modulated write laser beam 14. The pattern of the data track 28 corresponds to the pattern of the input data 10.

In order to read the data stored on the media 16, a read laser source 30 directs a read laser beam 32 to the surface of the media 16. This read laser beam 32 is of a much lower power than was the write laser beam 14, thereby ensuring that the read beam 32 does not mark the surface of the media 16 as did the write beam 14. The read laser beam 32 travels through an optical path that includes at least a second mirror 34, a beamsplitter 36, the beam combiner 18, the first mirror 20, and the objective lens 22. As with the write beam, the objective lens 22 focuses the read beam to a narrow point that is aligned with the desired data track 28. The read beam reflects off of the surface of the media 16 and passes back through the objective lens 22, off of the mirror 20, off of the beam combiner 18, and is directed by the beam splitter 36 to a detector 38. This reflected read beam is modulated by the data patterns included within the data track 28. Hence, the detector 38 detects this modulation pattern and generates an output signal 40 in response thereto. The output signal 40 corresponds to the input signal 10, thereby providing a means for retrieving the data that has been stored on the media 16.

As those skilled in the art will recognize, the representation of FIG. 1 is greatly simplified in that there are many elements and components that must be included in an optical storage system that are not shown in FIG. 1. For example, there must be some sort of head positioning means to position the objective lens 22 at the desired radial position with respect to the media 16. Moreover, some sort of means must be used to ensure that the respective write and read beams, including incident and reflected beams, follow the desired paths. These details are unimportant to the present invention. Nonetheless, as additional background information, representative details are shown, for example, in commonly owned copending patent applications Ser. No. 438,133, filed Nov. 1, 1982; Ser. No. 682,196, filed July 6, 1984; and Ser. No. 628,684, filed July 6, 1984.

Figure 2:
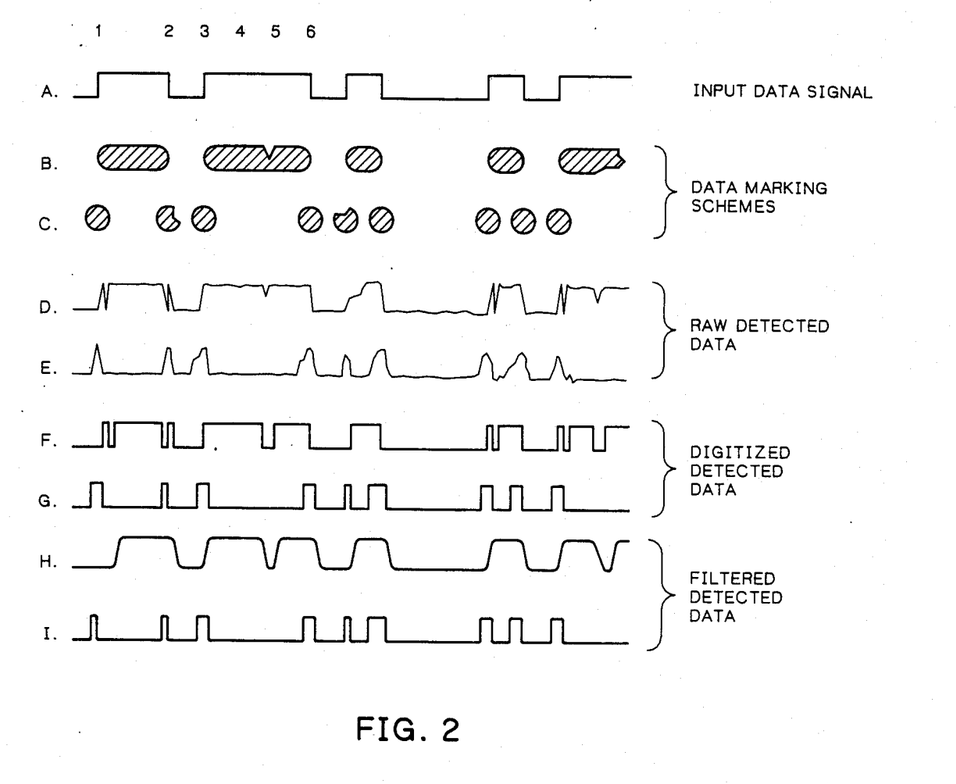
FIG. 2 depicts the data detection waveforms, A-I, associated with two optical data marking schemes.

Referring next to FIG. 2, two different types of data marking schemes are illustrated. For a given input data signal, such as is shown on line A of FIG. 2., two types of data marking schemes may be employed. The conventional marking scheme is as shown on line B. In accordance with this data marking scheme, the reflectivity (or transmissivity) of the optical recording media is altered whenever the input data signal is high. Thus, the shaded portions of line B might represent areas of high reflectivity, while the unshaded portions of line B could represent areas of low reflectivity. (This situation could, of course, be reversed without altering any of the discussion that follows.) Hence, assuming that the areas of low reflectivity and high reflectivity are written on a data track 28 (FIG. 1) as shown on line B of FIG. 2, the output signal 40 detected at the detector 38 (FIG. 1) would be similar to that shown on line D of FIG. 2. That is, when a mark having high reflectivity is recorded on the media surface, such as between points 1 and 2 of FIG. 2, most of the light will be reflected and returned to the detector 38, resulting in a signal that assumes a high level. Similarly, between points 2 and 3 of FIG. 2, which corresponds to an area of low reflectivity, little reflected light, if any, arrives at the detector 38, resulting in the detected signal assuming a low level.

As indicated in FIG. 2, the raw detected data signal on line D has alot of noise associated therewith. Much of this noise is attributable to variations in reflectivity that occur because of changes in the media, and because of imperfections associated with the components in the various electrical and optical paths. Some of the noise and irregularities of the waveform can be attributed to imperfections in the high reflectivity marks that have been placed on the media surface during the write operation. Whatever their source, all optical data storage systems are subject to both electrical and optical noise that can significantly degrade the quality of the signals involved. Because of this noise, a digital signal generated from the raw detected data could also have much noise associated therewith, such as shown on line F of FIG. 2, wherein many of the leading and trailing edges of the data are not clearly defined. Moreover, at some locations, such as is illustrated at time 5, an irregularity in the recorded data can actually cause the detected data to be in error. While filtering the digitized detected data can smooth out many of the irregularities associated with the noise involved, such as is shown on line H, some of the data errors, such as at time 5, still remain.

Another data marking scheme that could be used in an optical storage system in accordance with the present invention is depicted on line C of FIG. 2. In accordance with this data marking scheme, a data transition mark, or spot, is written on the media at a point that corresponds to a data transition. (A data transition occurs when the input data signal changes from a high signal to a low signal or visa versa.) Hence, data transition marks, or spots, are placed at times 1, 2, 3, and 6, and so on, of line C of FIG. 2. As with line B of FIG. 2, the spots of line C represent areas of high reflectivity. Hence, the output signal 40 detected at the detector 38 (FIG. 1) would be similar to that shown on line E of FIG. 2. That is, when a mark or spot having high reflectivity is recorded on the media surface, such as at times 1, 2, 3, and 6, most of the light will be reflected and returned to the detector 38, resulting in a signal that assumes a high level. At all other times, where there are no spots or marks on the disk, little reflected light, if any, arrives at the detector 38, resulting in the detected signal assuming a low level. The raw detected data from the spots of line C also may have alot of noise associated therewith. Thus, a digital signal generated from the raw detected data will also be affected by this noise in the form of variations in pulse width, as indicated on line G of FIG. 2. Filtering of this digitized detected data can be also be employed, if desired, as indicated on line I of FIG. 2. However, note that in connection with the detected data shown on lines G or I of FIG. 2 that a pulse is present corresponding to each spot of line C—which spots correspond to data transition—thereby allowing detection of all data transitions to be identified, even though as shown in FIG. 2 the width of the detected pulses may vary as a function of the noise and other irregularities that are present.

The informational content of the detected pulses shown in FIG. 2 on lines G or I is represented by the distance between the data transition spots of line C. Because the marking of the spots suffers from the same irregularities as the marking of the data on line B, and because the media upon which the spots are placed may vary over time, and because of many other irregularities that may enter into the spot detection method, an accurate measure of the distance between consecutive data transition marks or spots is difficult to achieve. The present invention is directed to an apparatus and method for accurately determining this distance between consecutive data transition spots.

Figure 3:
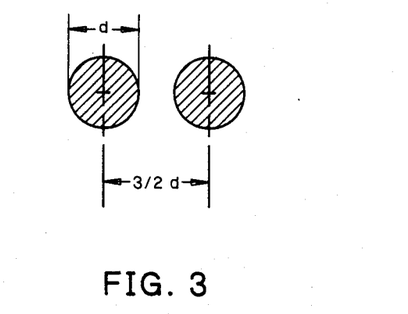
FIG. 3 illustrates the minimum spacing requirements for two data transition marks in accordance with the present invention.

Referring next momentarily to FIG. 3, there is shown a pictorial representation of the optimum spacing of data transition spots in accordance with the present invention. FIG. 3 illustrates how close together two spots may be placed where the data transition occurs after one data bit time, such as times 2 and 3 of FIG. 2. As shown in FIG. 3, if the nominal spot size has a diameter d associated therewith, an adjacent spot should be no closer than 3/2 d from the center of the previous spot.

Figure 4:
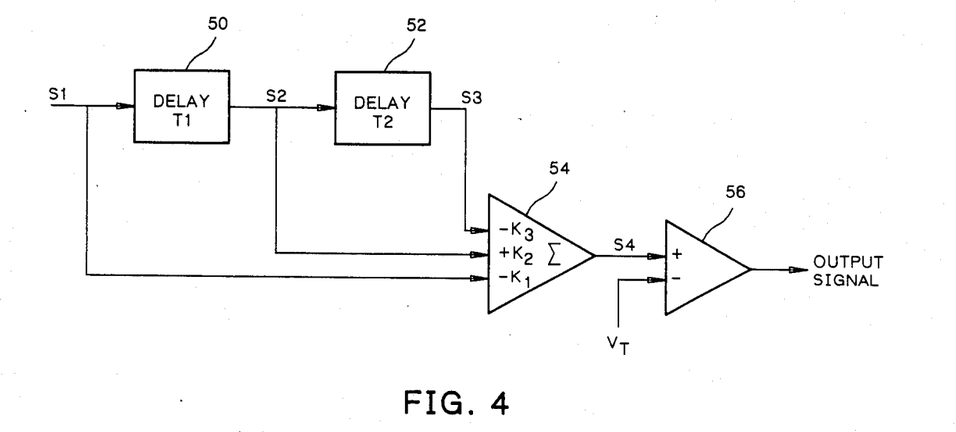
FIG. 4 is a block diagram of the basic components of an analog version of the present invention.
Figure 5:
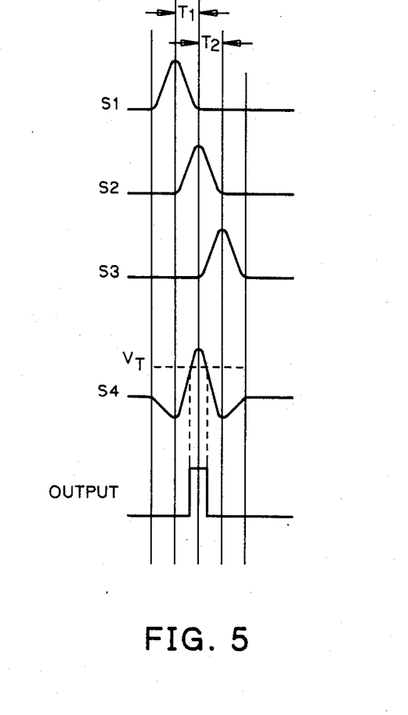
FIG. 5 is a timing diagram illustrating the processing of a detected pulse by the circuit of FIG. 4.

Referring next to FIGS. 4 and 5, a representation and explanation of an analog version of the present invention will be explained. An input data detection pulse, represented in both FIGS. 4 and 5 as S1, which may be for example one of the pulses from line I of FIG. 2, is directed to a first delay circuit 50. The delay circuit 50 delays the pulse S1 by a time T1. The output of the first delay circuit 50 is represented as S2. The delayed pulse S2 is directed to a second delay circuit 52, which delays the pulse further by an amount T2, which second delayed pulse is referenced as S3 in the Figures. The first delayed pulse S2 is multiplied by a scale factor $K_2$, while the input pulse S1 is multiplied by a scale factor $K_1$, and the second delayed pulse S3 is multiplied by a scale factor $K_3$. These signals are then combined in the analog adding circuit 54 to produce an output pulse S4 that comprises the first delayed pulse S2 having the input pulse S1 and the second delayed pulse S3 subtracted therefrom. Mathematically, the pulse S4 could be expressed as:

$$S4 = K_2 S2 - (K_1 S1 + K_3 S3).$$

The signal S4 is compared with a desired threshold level $V_T$ in comparator circuit 56. Only when the signal level of the S4 signal exceeds the threshold level $V_T$ with the output of the comparator circuit 56 go high. Otherwise the output signal remains at a low level. This output signal from the comparator circuit 56 is designated as the OUTPUT in the timing diagram of FIG. 5.

As is evident from the above description and from an examination of FIGS. 4 and 5, the desired output signal is a narrowed pulse that is coincident with the approximate center of the first delayed pulse S2. Advantageously, as will be evident from the description that follows in connection with FIG. 6, the spacing between adjacent OUTPUT pulses generated by a circuit such as shown in FIG. 4, is substantially independent of the width of the input pulse S1. Because the width of the input pulse S1 is largely a function of the diameter of the spot size that has been marked on the disk, the present invention advantageously allows an accurate measure of the distance between adjacent spots that are of nonuniform size.

Figure 6:
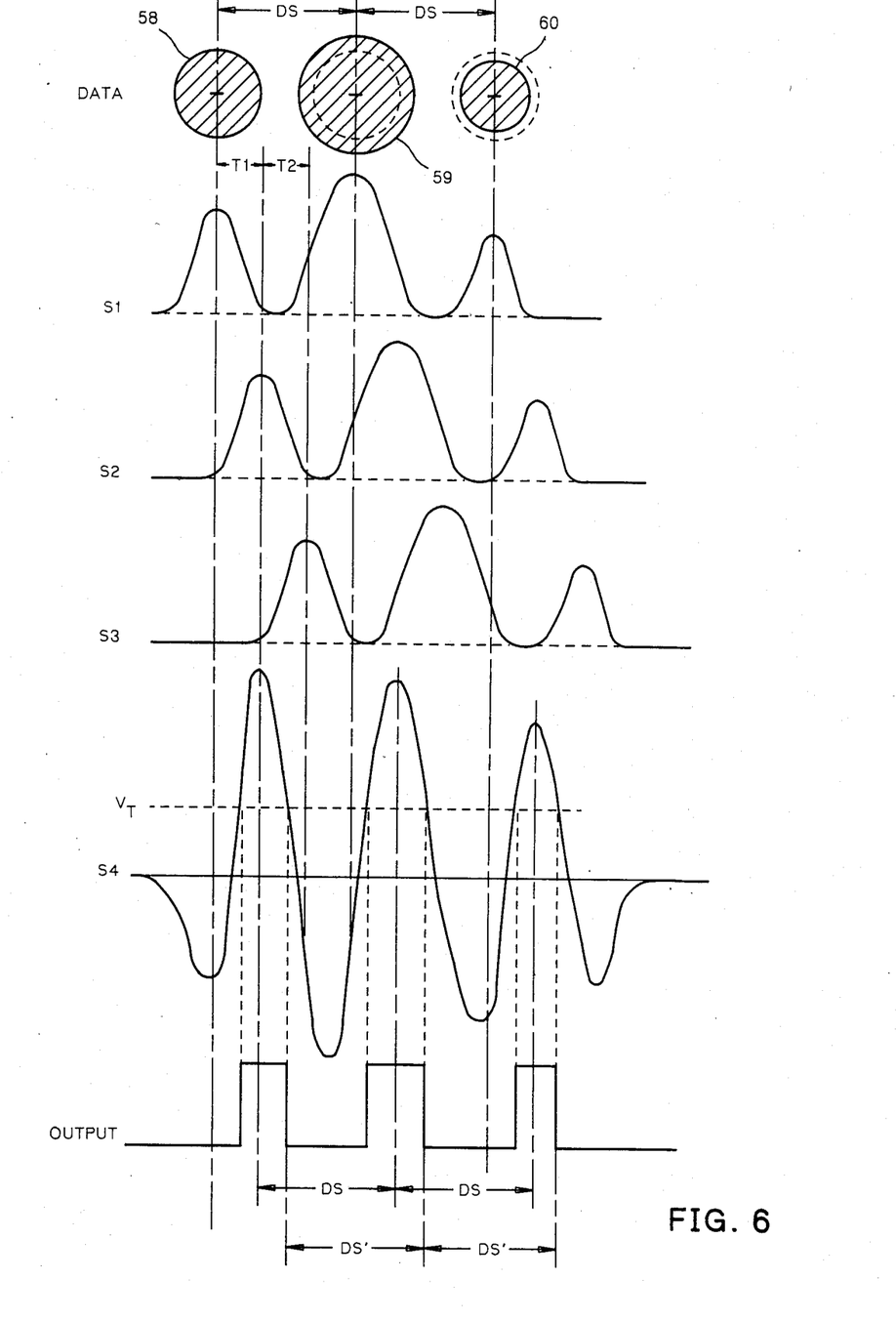
FIG. 6 is a timing diagram that illustrates the processing of a series of three detected pulses associated with non-uniform sized data marks by the circuit of FIG. 4.

Referring now to FIG. 6, there is shown a timing diagram similar to that of FIG. 5, except that three consecutive input pulses S1 are shown that are generated by three consecutive data transition spots 58, 59, and 60. For illustrative purposes, the spot size 58 is shown as being of nominal size. The spot size 59 is shown as being larger than nominal size (the nominal size being superimposed thereon as a dashed circle), and the spot 60 is shown as being less than nominal size (the nominal size also being superimposed thereon as a dashed circle). Hence, the series of input pulses S1 generated by the detector 38 (FIG. 1) as a result of reading the three data transition spots 58, 59, and 60 would be substantially as shown in FIG. 6 on the line labeled S1. As these three pulses pass through the first delay circuit 50 (FIG. 4) they are each delayed an amount T1. These delayed pulses are labeled as S2 in FIG. 6. The delayed pulses S2 are likewise passed through the second delay circuit S2 (FIG. 4), resulting in the train of pulses S3 shown in FIG. 6.

The signal S4 of FIG. 6 represents the combination of the signals S1, S2, and S3 when these signals are combined as described previously in connection with FIG. 4. That is, the signals S1 and S3 are subtracted from the signal S2, each signal being multiplied by an appropriate scale factor, in order to generate the signal S4. For purposes of FIG. 6, the scale factors $K_1$ and $K_3$ are each 1.0, while the scale factor $K_2$ is 2.0. When a suitable threshold level $V_T$ is applied to the comparator circuit 56, a series of output pulses are generated as shown in FIG. 6. The informational content of the data spots 58, 59, and 60 is contained in the spacing or distance between these output signal pulses, which distance is labeled DS in FIG. 6. This distance DS is indicated with respect to the output pulses relative to the peak of the S2 signal, which is the output of the first delay circuit 50 (FIG. 4). Advantageously, while the width of the output pulses may vary slightly, as evident from FIG. 6, attributable to the varying spot sizes from which the signals were generated, the trailing edge of these pulses are spaced a distance DS′ which is substantially equal to the distance DS. Hence, by using the output pulse train shown in FIG. 6 as a clock signal to toggle a flipflop, or other suitable circuit, the data can be recreated without loss of informational content.

Figure 7:
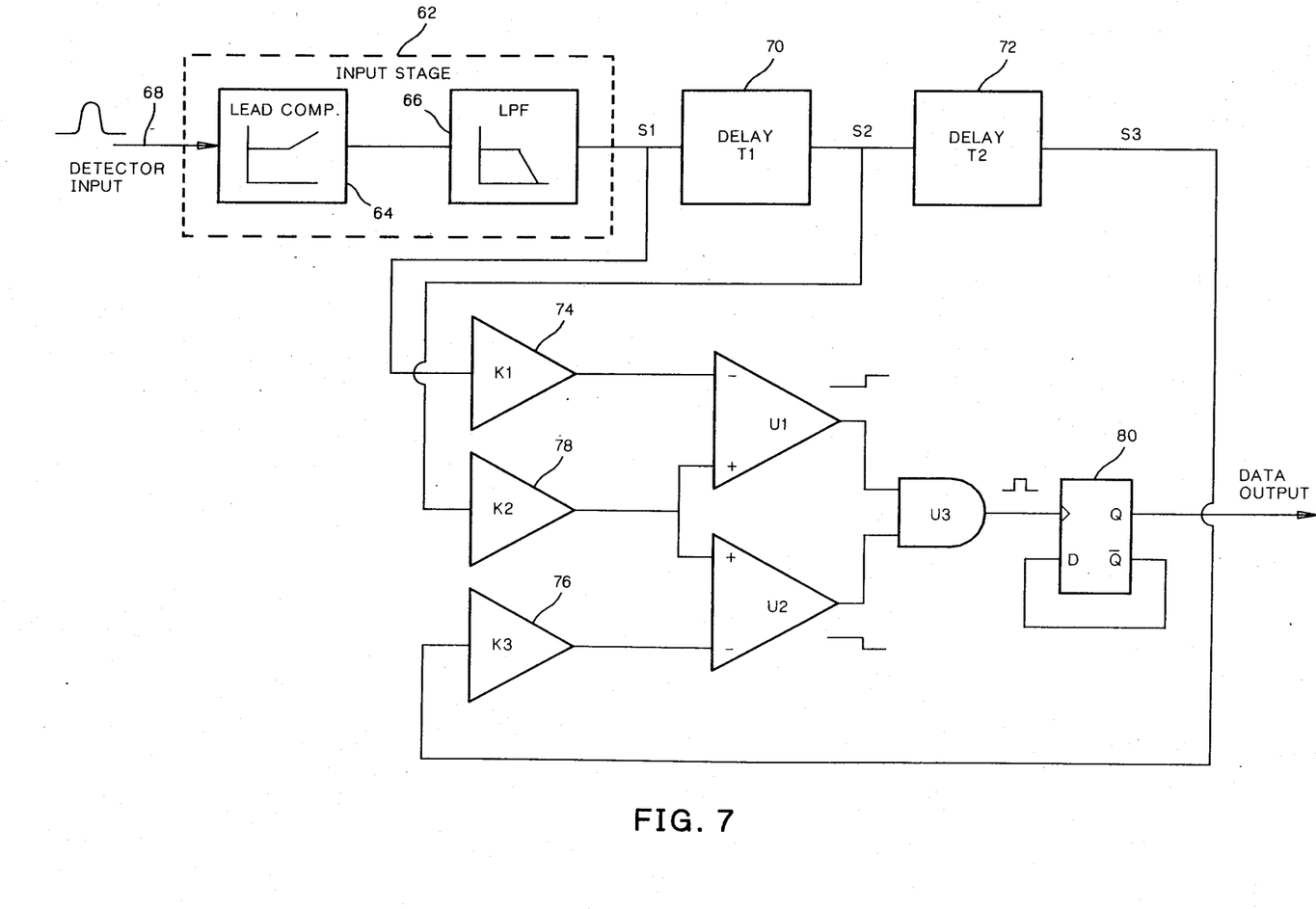
FIG. 7 is a block diagram of the basic components of a digital version of the present invention.

Referring next to FIG. 7, a block diagram of a digital version of the present invention is shown. In accordance with this embodiment, an input stage 62 may be employed that includes lead compensation 64 and a low pass filter 66. As such, the detector input signal on signal line 68 corresponds to the raw detected data, such as is shown on line E in FIG. 2, while the signal appearing at the output of the input stage 62, identified as S1, corresponds to the filtered detected data signal on line I of FIG. 2. As with the analog version, the circuit of FIG. 7 includes a first delay circuit 70, and a second delay circuit 72. The first delay circuit 70 delays the signal S1 by an amount T1, and the second delay circuit 72 delays the first delayed signal S2 by an amount T2 to produce a second delayed signal S3. S1 may be multiplied by an appropriate scale factor K1 with amplifying circuit 74 and directed to the negative input of a comparator circuit U1. Similarly, the second delayed signal S3 may be multiplied by an appropriate scale factor K3 with amplifier circuit 76 and presented to the negative input of a second comparator circuit U2. The first delayed signal S2 may be multiplied by a scale factor K2 with amplifier circuit 78 and presented to both the positive inputs of the comparator circuits U1 and U2. As long as the negative input to comparator circuit U1, K1S1, exceeds the signal applied to the positive input thereof, K2S2, then the output of U1 is a low digital signal. As soon as the amplitude of the K2S2 signal exceeds the amplitude of the K1S1 signal, however, the output of the U1 comparator will switch to a positive logic level. Similarly, the output of the comparator circuit U2 remains high for so long as the amplitude of the K2S2 signal exceeds the amplitude of the K3S3 signal. Because of the delays between the S1, S2, and S3 signals, the output of the comparator U1 is first low and will then switch high, at which time the output of the comparator U2 will be high and will then switch low. Hence, there is a period of time during which both the outputs of the comparators U1 and U2 are high. During this time period, the output of AND gate U3 will likewise go high, which AND gate has its two inputs connected respectively to the outputs of the comparators U1 and U2. The pulse generated at the output of the AND gate U3 corresponds to the output signal generated from the comparator circuit 56 in FIG. 4. This is used to clock a flipflop 80, the output of which is a data output signal that represents the data that has been detected.

Figure 8:
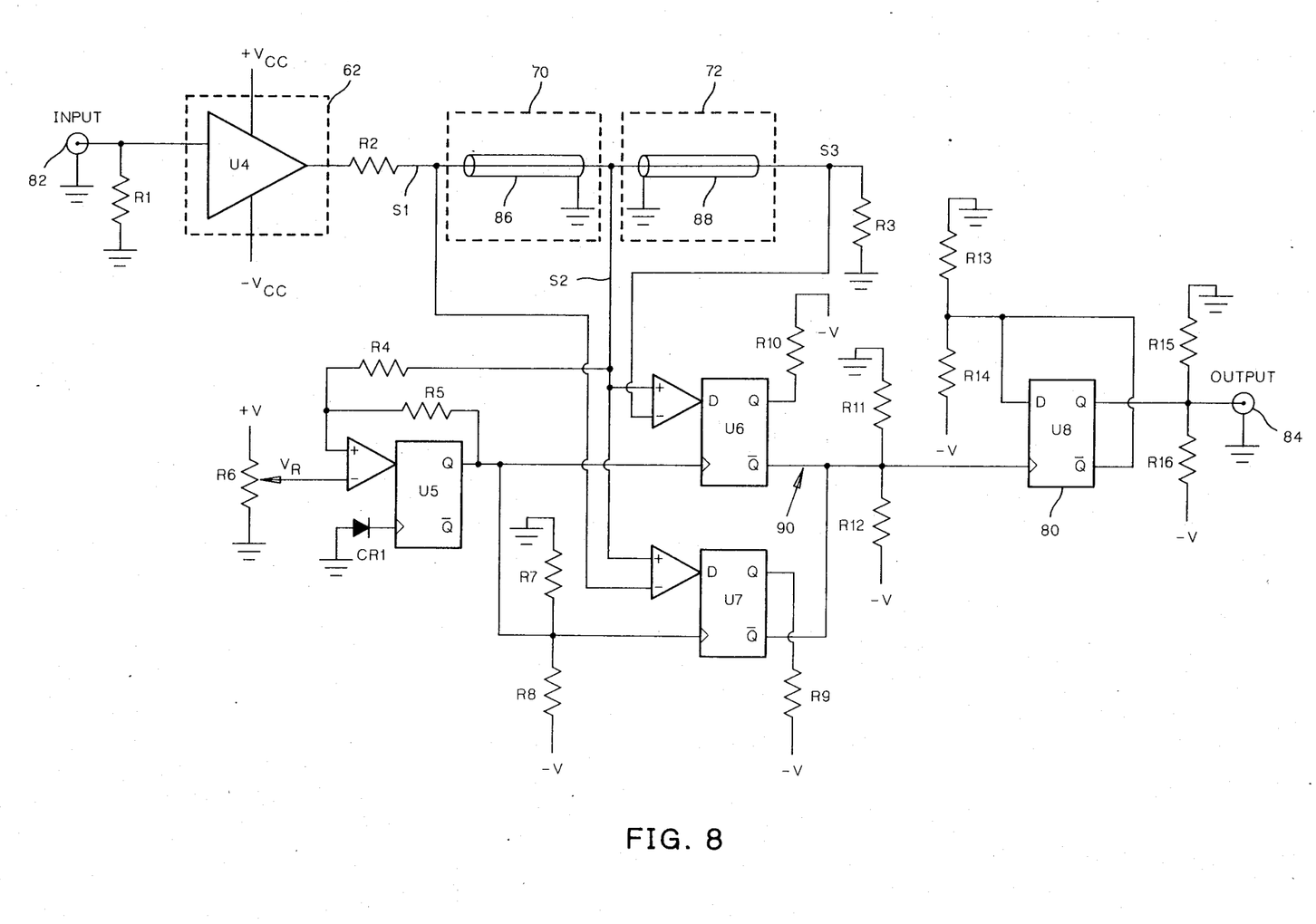
FIG. 8 is a more detailed and schematic diagram of a digital version of the present invention.

Referring next to FIG. 8, a schematic diagram of a preferred embodiment of the digital version of the present invention is shown. The timing diagram of FIG. 9 corresponds to the operation of FIG. 8, so these two FIGURES should be referred to jointly. In FIG. 8, the input signal is coupled to an input terminal 82. This input terminal, as well as the output terminal 84 are represented as coax connectors because in the preferred embodiment these signals are most efficiently transferred throughout the circuit using coax cables having a prescribed characteristic impedance. The resistors R1, R2, and R3, are used primarily to match the characteristic impedance of the cables that are used, and in the preferred embodiment these resistors have the value of approximately 50 ohms. The input connector 82 is coupled to the input stage 62, realized with an operational amplifier U4, which in turn could be realized with the model LH0063 amplifier manufactured by National Semiconductor. Data provided by the manufacturer of the U4 amplifier would allow those skilled in the art to connect the same so as to realize the desired filtering and compensation functions. The first delay circuit 70 is realized with a fixed length of coax cable 86. Similarly the second delay circuit 72 is realized with a fixed length of coax cable 88. In the preferred embodiment, these lengths are selected so that the delay is approximately fifteen (15) nanoseconds. Both delays are made equal.

The output of the first delay circuit 70, S2, is compared with the S1 signal at comparator circuit U7. Similarly, the signal S2 is compared with the delayed signal S3 at the comparator circuit U6. The comparator circuits U6 and U7 may be realized using an MC1651 manufactured by Motorola, which circuit not only includes the comparator function, but also includes the equivalent of a D flipflop which may be strobed at an appropriate time. The strobe signal used in the preferred embodiment is generated by another comparator circuit, U5, which likewise may be realized with an MC1651 device. The S2 signal is directed to the positive input of this U5 comparator circuit and compared to a desired reference voltage $V_R$. As indicated in the timing diagram of FIG. 9, when $V_R$ is selected at a desired level, as adjusted by the variable resistor R6, then the effect of the comparator circuit U5 is to convert the analog pulse to a narrow digital clock pulse appearing at the Q output of U5. This clock pulse is used to strobe the comparator circuits U6 and U7, which strobing ensures that the outputs of these comparator circuits U6 and U7 will always assume a desired value in the absence of an S2 signal.

Figure 9:
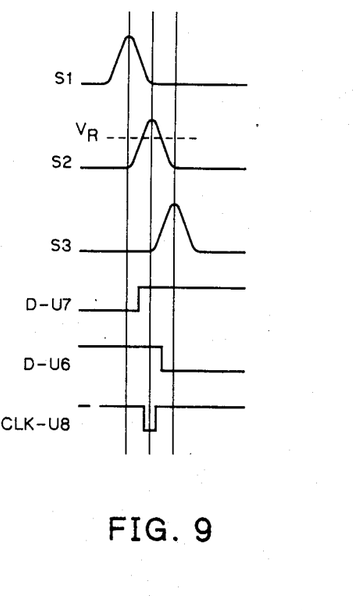
FIG. 9 is a simplified timing diagram illustrating some of the key signals associated with the operation of the circuit of FIG. 8.

As indicated in FIG. 9, the D input of the comparator circuit U7 remains low until such time as the amplitude of the S2 signal exceeds the amplitude of the S1 signal. Similarly, the D input to the U6 comparator circuit is high for so long as the amplitude of the S2 signal exceeds the amplitude of the S3 signal. The appropriate outputs of the U6 and U7 comparator/D-flipflop circuits are wire OR'd at 90. Because of the manner in which the circuits U6 and U7 are strobed, the signal at 90, which signal becomes a clock input to the flipflop U8, becomes a clock signal that toggles the flipflop U8, causing it to change state at the occurence of each clock pulse. For the particular configuration shown in FIG. 8, this clock signal is a negative going clock pulse, as indicated in FIG. 9, although as those skilled in the art will recognize, a positive going clock pulse could also be generated with appropriate logic circuitry.

The resistors R4 and R5 are used in conjunction with the comparator circuit U5 in order to create a desired hysteresis effect with respect to the switching threshold level, thereby ensuring a minimum amount of noise at the Q output of U5. Resistors R9 and R10 are used to merely terminate the Q outputs of comparator circuits U6 and U7 respectively. Resistors R7 and R8, R11 and R12, R13 and R14, and R15 and R16 are used to provide a desired bias level for the various signal lines involved. In a preferred embodiment, the voltage $-V$ is $-5.2$ volts, and resistors R7, R11, R13, and R15 are approximately 82 ohms; while resistors R8, R14, R12, and R16 are 130 ohms. With a negative voltage of $-5.2$ volts, R9 and R10 are selected to be 330 ohms.

As indicated in FIG. 8, the preferred scale factors for the signals S1, S2, and S3 are all 1.0. Selecting each of the signals to be equal in this fashion ensures that the desired results are achieved for this digital embodiment of the invention. That is, an analysis of the circuit of FIG. 8 or FIG. 7 reveals that the clock pulse directed to the flipflop 80 (U8) can be expressed as sine squared function. That is, the signal S2 minus S1 can be expressed as $$S2 - S1 = -1 + e^{(-jt_d)} \qquad (1)$$

where $t_d$ is the delay associated with the delay circuit 70 and 72. This expression can be further expressed as $$\begin{aligned} S2 - S1 &= -(1 - e^{(-jt_d)}) \qquad (2) \\ &= -[(1 - \cos t_d) + j\sin t_d] \\ &= 2\sin(t_d/2) < (-\pi + \pi/2 - t_d/2) \end{aligned}$$

Similarly, it can be shown that $$\begin{aligned} S2 - S3 &= e^{(-jt_d)} - e^{(j2t_d)} \qquad (3) \\ &= e^{(-jt_d)}[1 - e^{(-jt_d)}] \\ &= e^{(-jt_d)}[(1 - \cos t_d) - j\sin t_d] \\ &= 2\sin(t_d/2) < (-t_d + \pi/2 - t_d/2) \end{aligned}$$

Thus, the multiplying of the expressions S2 minus S1 times S2 minus S3, which is effectively what the circuits of FIGS. 7 and 8 are doing, results in $$(S2-S1)(S2-S3) = 4\sin^2(t_d/2)\angle\phi \qquad (4)$$

where the angle $\phi$ is unimportant for purposes of the present invention. Advantageously, this output has produced the desired pulse slimming and is free of dc content. Furthermore, any dc offset present in the input signal will not be carried to the output signal.

This advantageous result would not be achieved if the scale factors or the ratios were not all selected to be 1.0 for the digital embodiment shown in FIGS. 7 and 8.

While the invention herein disclosed has been described by means of specific embodiments and applications thereof, numerous modifications and variations could be made thereto by those skilled in the art without departing from the spirit and scope of the present invention. It is therefore to be understood that within the scope of the amended claims, that the invention may be practiced otherwise than as specifically described here.

We claim:

1. A data detection system for detecting the spacing between data transition marks recorded on a recording surface, said system comprising:
   a data head positioned to sense said data transition marks, said data head including means for generating a data transition signal whenever one of said data transition marks passes by said head;

means for creating relative motion between said data head and said recording surface, whereby selected data transition marks pass by said head;

first delay means for generating a first delayed data transition signal that comprises said data transition signal delayed by a first prescribed time;

second delay means for generating a second delayed data transition signal that comprises said data transition signal delayed by a second prescribed time;

signal combining means for subtracting said data transition signal and said second delayed data transition signal from said first delayed data transition signal in order to generate a data transition pulse signal, said signal combining means comprising:

a first difference circuit for subtracting the data transition signal from the first delayed data transition signal and for generating a first difference signal as a result thereof;

a second difference circuit for subtracting the second delayed data transition signal from the first delayed data transition signal and for generating a second difference signal as a result thereof; and means for combining said first and second difference signal in order to produce said data transition pulse signal; and means responsive to said data transition pulse signal for changing the level or state of a logic data signal, whereby said logic data signal changes status in response to each data transition mark that passes by said head, said data logic signal thereby being representative of the data recorded on said recorded surface as detected by said data head.

2. The data detection system of claim 1 wherein said first delayed data transition signal is multiplied by a fixed gain factor K2 prior to being presented to said first difference circuit and said second difference circuit.

3. The data detection system of claim 2 wherein said data transition signal and said second delayed data transition signal are each multiplied by a fixed gain factor K1 and K3, respectively, prior to being presented to said first and second difference circuits, respectively.

4. The data detection system of claim 3 wherein the ratios K2/K1 and K2/K3 each have values of from 1.0 to 2.0.

5. A data detection system for detecting the spacing between data transition marks recorded on a recording surface, said system comprising:

a data head positioned to sense said data transition marks, said data head including means for generating a date transition signal whenever one of said data transition marks passes by said head;

means for creating relative motion between said data head and said recording surface, whereby selected data transition marks pass by said head;

first delay means for generating a first delayed data transition signal that comprises said data transition signal delayed by a first prescribed time;

second delay means for generating a second delayed data transition signal that comprises said data transition signal delayed by a second prescribed time, wherein said first delay means and said second delay means are connected in tandem, said first delayed data transition signal from said first delay means being connected as an input signal to said second delay means;

signal combining means for subtracting said data transition signal and said second delayed data transition signal from said first delayed data transition signal in order to generate a data transition pulse signal; and means responsive to said data transition pulse signal for changing the level or state of a logic data signal, whereby said logic data signal changes status in response to each data transition mark that passes by said head, said data logic signal thereby being representative of the data recorded on said recorded surface as detected by said data head.

6. The data detection system of claim 5 wherein the first prescribed delay time of said first delay means is substantially equal to the second prescribed delay time of the second delay means.

7. A data detection system for detecting the spacing between data transition marks recorded on a recording surface, said system comprising;

a data head positioned to sense said data transition marks, said data head including means for generating a data transition signal whenever one of said data transition marks passes by said head;

means for creating relative motion between said data head and said recording surface, whereby selected data transition marks pass by said head;

first delay means for generating a first delayed data transition signal that comprises said data transition signal delayed by a first prescribed time;

second delay means for generating a second delayed data transition signal that comprises said data transition signal delayed by a second prescribed time;

an input stage through which said data transition signal passes prior to being presented to said first delay means, said input stage serving to buffer said data transition signal prior to delaying it with said first and second delay means;

signal combining means for subtracting said data transition signal and said second delayed data transition signal from said first delayed data transition signal in order to generate a data transition pulse signal; and means responsive to said data transition pulse signal for changing the level or state of a logic data signal, whereby said logic data signal changes status in response to each data transition mark that passes by said head, said data logic signal thereby being representative of the data recorded on said recorded surface as detected by said data head.

8. The data detection system of claim 7 wherein said input stage comprises compensation means for compensating said data transition signal to improve the frequency response thereof.

9. The data detection system of claim 7 wherein said input stage comprises low pass filter means for removing undesired high frequency components from said data transition signal.

10. A data detection apparatus for detecting data recorded on a recording surface of an optical storage system, the information content of said data being contained in the spacing between data transition marks recorded on the recording surface, said optical storage system including means for moving the recording surface at a substantially constant rate past an optical head, said optical head including means for sensing the data transition marks as said marks pass by said head and means for generating a data transition pulse in response to said sensing, said data detection apparatus comprising:
- first delay means for generating a first delayed pulse that comprises said data transition pulse delayed by a first prescribed time;
- second delay means for generating a second delayed pulse that comprises said data transition pulse delayed by a second prescribed time;
- first comparison means for comparing the amplitude of said first delayed pulse with the amplitude of said second delayed pulse and for generating a first comparison signal that assumes a first logical level whenever the amplitude of said first delayed pulse is greater than the amplitude of said second delayed pulse, and that assumes a second logical level at all other times;
- second comparison means for comparing the amplitude of said first delayed pulse with the amplitude of said data transition pulse and for generating a second comparison signal that assumes said first logical level whenever the amplitude of said first delayed pulse is greater than the amplitude of said data transition pulse, and that assumes said second logical level at all other times;
- combining means for combining said first and second comparison signals to form a data clock signal;
- flip-flip means responsive to said data clock signal for generating a data signal that changes state at each occurrence of the data clock signal, whereby the time between transitions of said data signal represents the information content of the data recorded on the recording surface of said optical storage signal.

11. The data detection apparatus of claim 10 wherein the second prescribed time delay of said second delay means is substantially twice the first prescribed time delay of said first delay means, whereby the time between the occurrence of said data transition pulse and said first delayed pulse is substantially equal to the time between the occurrence of said first delayed pulse and said second delayed pulse.

12. The data detection apparatus of claim 11 wherein said first delay means comprises a first pulse delay device, that delays the data transition pulse by the prescribed amount, and wherein said second delay means comprises said first pulse delay device connected in series with a second pulse delay device, said second pulse delay device being substantially identical to said first pulse delay device.

13. The data detection apparatus of claim 12 wherein the pulse delay device of said first and second pulse delay devices comprises a prescribed length of coax cable through which said data transition pulse must pass.

14. A method of detecting data recorded on a recording surface of a data storage system, the information content of said data being contained in the spacing between data transition marks recorded on the recording surface, said data storage system including means for moving the recording surface at a substantially constant rate past a data head, said head including means for sensing the data transition marks as said marks pass by said head and means for generating a data transition pulse in response to said sensing, said data detection method comprising the steps of:
- (a) delaying said data transition pulse by a first prescribed time to create a first delayed pulse;
- (b) delaying said first delayed pulse by said first prescribed time to create a second delayed pulse;
- (c) subtracting said second delayed pulse from said first delayed pulse to create a fourth pulse;
- (d) subtracting said data transition pulse from said first delayed pulse to create a third pulse;
- (e) combining said third and fourth pulses to create a fifth pulse; and
- (f) using said fifth pulse as a measure of the occurrence of a data transition mark within the data recorded on the recording surface, whereby the time between occurrences of said fifth pulse represents the informational content of the detected data, said fifth pulse being used to toggle a flip-flop, an output signal from said flip-flop comprising the detection data.

15. A method of detecting data recorded on a rotating recording surface of a data storage system, the information content of said data being contained in the distance between successive data transition marks recorded on the recording surface, said data storage system including a head for sensing when a data transition mark passes thereunder, said head including circuitry for generating an analog data transition pulse signal that peaks substantially coincident with the passage of the data transition mark under said head, said data detection method comprising the steps of:
- (a) delaying said data transition pulse signal by a first prescribed time to create a first delayed analog pulse signal;
- (b) delaying said data transition pulse signal by a second prescribed time to create a second delayed analog pulse signal;
- (c) comparing the amplitude of said first delayed analog pulse signal with the amplitude of said second delayed analog pulse signal and generating a first comparison logic signal that assumes a first logical level whenever the amplitude of the first delayed analog pulse signal exceeds the amplitude of the second delayed analog pulse signal, and that assumes a second logical level at all other times;
- (d) comparing the amplitude of said first delayed analog pulse signal with the amplitude of said analog data transition pulse signal and generating a second comparison logic signal that assumes said first logical level whenever the amplitude of the first delayed analog pulse signal exceeds the amplitude of the analog data transition pulse signal, and that assumes a said second logical level at all other times;
- (e) logically combining the first and second comparison logic signals to generate a data transition clock pulse; and
- (f) using said data transition clock pulse as a measure of the occurrence of a data transition mark within the data recorded on the recording surface, whereby the time between occurrences of successive data transition clock pulses represents the informational content of the detected data.

* * * * *